(12) United States Patent
Aston et al.

(10) Patent No.: US 9,537,340 B2
(45) Date of Patent: Jan. 3, 2017

(54) METHOD FOR SENDING AN ELECTRICAL CURRENT BETWEEN A BATTERY AND A DEVICE

(71) Applicant: The Boeing Company, Chicago, IL (US)

(72) Inventors: Richard W. Aston, Brea, CA (US); Michael John Langmack, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 418 days.

(21) Appl. No.: 14/229,989

(22) Filed: Mar. 31, 2014

(65) Prior Publication Data

US 2014/0210416 A1 Jul. 31, 2014

Related U.S. Application Data

(62) Division of application No. 12/697,696, filed on Feb. 1, 2010, now Pat. No. 8,703,319.

(51) Int. Cl.

| | |
|---|---|
| *H01M 10/647* | (2014.01) |
| *H02J 7/00* | (2006.01) |
| *H01M 10/6568* | (2014.01) |
| *H01M 10/613* | (2014.01) |
| *H01M 2/10* | (2006.01) |
| *H01M 10/625* | (2014.01) |
| *H01M 10/623* | (2014.01) |

(52) U.S. Cl.

CPC .......... *H02J 7/0068* (2013.01); *H01M 10/613* (2015.04); *H01M 10/6568* (2015.04); *H01M 2/1022* (2013.01); *H01M 2/1072* (2013.01); *H01M 10/623* (2015.04); *H01M 10/625* (2015.04)

(58) Field of Classification Search

None
See application file for complete search history.

(56) References Cited

U.S. PATENT DOCUMENTS

| | | | |
|---|---|---|---|
| 3,480,251 | A | 11/1969 | Pietrzak |
| 5,763,116 | A | 6/1998 | Lapinski et al. |
| | | (Continued) | |

FOREIGN PATENT DOCUMENTS

| | | |
|---|---|---|
| WO | WO2009052928 | 4/2009 |

OTHER PUBLICATIONS

Office Action, dated Apr. 24, 2013, regarding U.S. Appl. No. 12/697,696, 22 pages.

(Continued)

*Primary Examiner* — Yoshitoshi Takeuchi
(74) *Attorney, Agent, or Firm* — Yee & Associates, P.C.

(57) ABSTRACT

An apparatus comprises a first plurality of walls, a second plurality of walls, and a plurality of channels formed by the first plurality of walls and the second plurality of walls. The second plurality of walls meets the first plurality of walls at substantially right angles and forms a housing with a first side and a second side. The plurality of channels extends through the housing from the first side to the second side. The plurality of channels has a first plurality of openings on the first side. The plurality of channels has a second plurality of openings on the second side. The plurality of channels has substantially a same shape and is configured to receive a plurality of battery cells.

11 Claims, 10 Drawing Sheets

(56) References Cited

U.S. PATENT DOCUMENTS

| | | | |
|---|---|---|---|
| D424,807 S | 5/2000 | Dembicks | |
| 6,653,018 B2 | 11/2003 | Takahashi et al. | |
| 8,076,019 B2 | 12/2011 | Lohr et al. | |
| 8,703,319 B1 | 4/2014 | Aston et al. | |
| 2001/0038938 A1* | 11/2001 | Takahashi | H01G 2/14 429/53 |
| 2006/0134514 A1 | 6/2006 | Lenain et al. | |
| 2007/0009787 A1 | 1/2007 | Straubel et al. | |
| 2008/0311466 A1* | 12/2008 | Yang | H01M 10/486 429/62 |
| 2009/0004555 A1* | 1/2009 | Lohr | H01M 2/105 429/120 |
| 2015/0107094 A1 | 4/2015 | Bohman et al. | |

OTHER PUBLICATIONS

Notice of Allowance, dated Nov. 22, 2013, regarding U.S. Appl. No. 12/697,696, 16 pages.
Bohman et al., "Battery Cell Isolation System", U.S. Appl. No. 13/033,201, filed Feb. 23, 2011, 62 pages.
Office Action, dated Nov. 7, 2013, regarding U.S. Appl. No. 13/033,201, 21 pages.
Final Office Action, dated May 30, 2014, regarding U.S. Appl. No. 13/033,201, 19 pages.
Notice of Allowance, dated Aug. 15, 2014, regarding U.S. Appl. No. 13/033,201, 7 pages.
Notice of Allowance, dated Jul. 20, 2015, regarding U.S. Appl. No. 14/578,762, 18 pages.

* cited by examiner

METHOD FOR SENDING AN ELECTRICAL CURRENT BETWEEN A BATTERY AND A DEVICE

This application is a divisional application of U.S. application Ser. No. 12/697,696, filed Feb. 1, 2010.

GOVERNMENT LICENSE RIGHTS

This application was made with Government support under contract number FA 8002-06-C-0510 awarded by the United States Air Force. The Government has certain rights in this application.

BACKGROUND INFORMATION

1. Field

The present disclosure relates generally to battery systems. Still more particularly, the present disclosure relates to a method and apparatus to send an electrical current between a battery and an electrical device.

2. Background

In the aerospace industry, batteries are used for a number of different purposes. For example, batteries may be used as a backup in case a primary power generator fails to operate as desired. In other examples, batteries are used to provide power when more power is needed than can be generated by the primary power generator.

For example, spacecraft often carry onboard power generation systems that include power generators and batteries. These spacecraft may include, for example, satellites. A satellite orbiting the earth may use a power generator in the form of solar cells. The solar cells generate power from exposure to sunlight. This power is used by various devices in the satellite. These devices may include, for example, communications systems, switches, computers, and other suitable types of devices.

The satellite, however, may not always have sufficient exposure to sunlight to generate the amount of power needed by the satellite. Batteries are used in the satellite to supply power in these situations. When sufficient sunlight is present, the solar cells are used to recharge the battery, as well as provide power to other devices on the satellite.

Typically, a battery is comprised of battery cells. Each battery cell generates electricity and provides power to different devices in the satellite. These battery cells are arranged in series or parallel to form the battery.

A battery for use in a spacecraft is designed to provide proper support for the battery cells. This support is designed to support the battery cells during loadings and/or vibrations that may be encountered. These loadings and/or vibrations may be encountered during testing, transportation, and/or launching of the spacecraft. The loadings also may occur from internal pressures from within the battery cells during operation of the battery.

Additionally, heat is another consideration taken into account in designing a battery. When a battery is used, chemical reactions occur to generate the electricity to provide power to the different devices. Chemical reactions also occur during recharging of the batteries.

These chemical reactions result in a production of heat. As a result, a battery is designed such that the heat produced does not damage or reduce the ability of the battery to generate power.

For example, a battery may be designed such that heat generated by the battery cells is conducted away to a heat sink. The conduction of heat is to reduce the heating of the battery cells above desired temperatures. These temperatures are selected as ones that avoid damaging and/or reducing the life of the battery cells in the battery.

In designing batteries for use in spacecraft, such as satellites, weight and complexity are examples of other design considerations. Reducing the weight of the satellite is an important design consideration. For example, weight limitations are often present based on the launch vehicle that may be used to place the satellite into orbit. If the satellite weighs too much, a more expensive launch vehicle may be needed. In some cases, the weight of the satellite could make placing the satellite into orbit unattainable.

Reducing the complexity of satellites also may reduce the cost of a satellite. By reducing the complexity of a satellite, the time needed to assemble and launch a satellite also may be reduced. As yet another example, by reducing the number of components in a satellite, the amount of labor needed to assemble and rework parts for a satellite also may be reduced. In this manner, costs also may be reduced for satellites.

Therefore, it would be advantageous to have a method and apparatus which takes into account one or more of the issues discussed above, as well as possibly other issues.

SUMMARY

In one advantageous embodiment, an apparatus comprises a first plurality of walls, a second plurality of walls, and a plurality of channels formed by the first plurality of walls and the second plurality of walls. The second plurality of walls meets the first plurality of walls at substantially right angles and forms a housing with a first side and a second side. The plurality of channels extends through the housing from the first side to the second side. The plurality of channels has a first plurality of openings on the first side. The plurality of channels has a second plurality of openings on the second side. The plurality of channels has substantially a same shape and is configured to receive a plurality of battery cells.

In another advantageous embodiment, a battery system comprises a housing having a first side and a second side and a plurality of channels extending from the first side to the second side of the housing. The second side is configured to be connected to a cooling system. The plurality of channels has a first plurality of openings on the first side and a second plurality of openings on the second side. The plurality of channels is configured to receive a plurality of battery cells through the first plurality of openings. The plurality of battery cells is associated with the cooling system when the plurality of battery cells is placed into the plurality of channels. The second side is connected to the cooling system such that heat passes directly from the plurality of battery cells to the cooling system.

In yet another advantageous embodiment, a method is present for sending an electrical current between a battery and a device. A battery is connected to the device. The battery comprises a housing having a first side and a second side, a plurality of battery cells, and a plurality of channels extending from the first side to the second side of the housing. The second side is configured to be connected to a cooling system. The plurality of channels has a first plurality of openings on the first side and a second plurality of openings on the second side. The plurality of battery cells is located within the plurality of channels. The plurality of battery cells is directly connected to the cooling system through the plurality of second openings on the second side such that heat passes directly from the plurality of battery cells to the cooling system. The electrical current is sent between the battery and the device.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
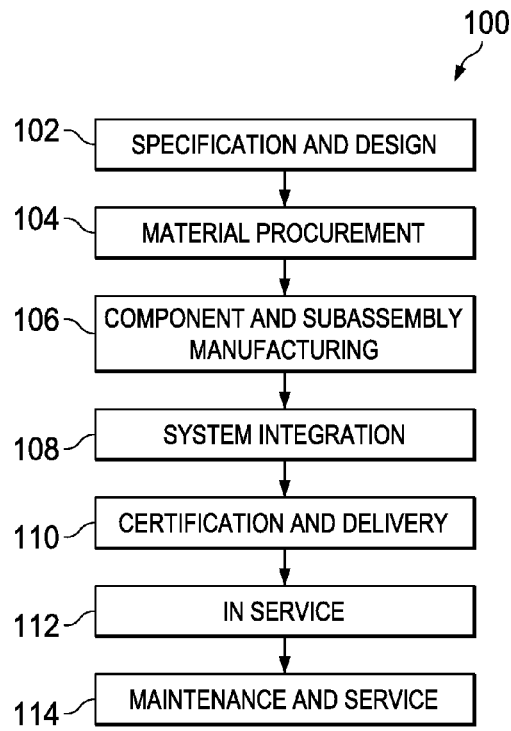
FIG. 1 is an illustration of a spacecraft manufacturing and service method in accordance with an advantageous embodiment.
Figure 2:
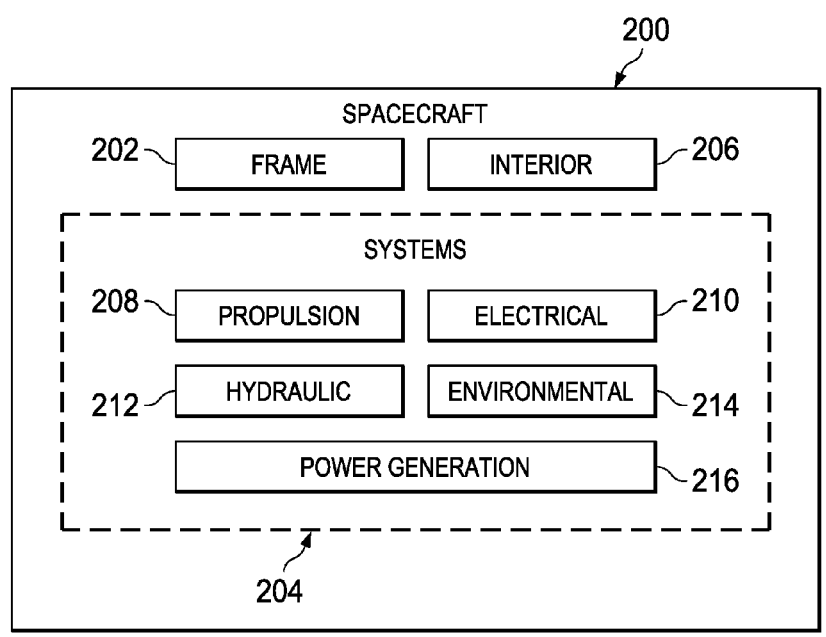
FIG. 2 is an illustration of a spacecraft in which an advantageous embodiment may be implemented.

Referring more particularly to the drawings, embodiments of the disclosure may be described in the context of spacecraft manufacturing and service method 100 as shown in FIG. 1 and spacecraft 200 as shown in FIG. 2. Turning first to FIG. 1, an illustration of a spacecraft manufacturing and service method is depicted in accordance with an advantageous embodiment. During pre-production, spacecraft manufacturing and service method 100 may include specification and design 102 of spacecraft 200 in FIG. 2 and material procurement 104. During production, component and subassembly manufacturing 106 and system integration 108 of spacecraft 200 in FIG. 2 takes place. Thereafter, spacecraft 200 in FIG. 2 may go through certification and delivery 110 in order to be placed in service 112. While in service 112 by a customer, spacecraft 200 in FIG. 2 may be scheduled for routine maintenance and service 114, which may include modification, reconfiguration, refurbishment, and other maintenance or service.

Each of the processes of spacecraft manufacturing and service method 100 may be performed or carried out by a system integrator, a third party, and/or an operator. In these examples, the operator may be a customer. For the purposes of this description, a system integrator may include, without limitation, any number of spacecraft manufacturers and major-system subcontractors; a third party may include, without limitation, any number of venders, subcontractors, and suppliers; and an operator may be company, a military entity, a service organization, and so on.

With reference now to FIG. 2, an illustration of a spacecraft is depicted in which an advantageous embodiment may be implemented. In this illustrative example, spacecraft 200 is produced by spacecraft manufacturing and service method 100 in FIG. 1. Spacecraft 200 may include frame 202 with a plurality of systems 204 and interior 206.

Examples of plurality of systems 204 include one or more of propulsion system 208, electrical system 210, hydraulic system 212, environmental system 214, and power generation system 216. In these illustrative examples, spacecraft 200 may be, for example, without limitation, a satellite, a launch vehicle, a space station, and/or some other suitable type of spacecraft. Although an aerospace example is shown, different advantageous embodiments may be applied to other industries, such as the automotive and ship building industries.

Apparatus and methods embodied herein may be employed during at least one of the stages of spacecraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while spacecraft 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while spacecraft 200 is in service 112 and/or during maintenance and service 114 in FIG. 1. The use of a number of the different advantageous embodiments may substantially expedite the assembly of and/or reduce the cost of spacecraft 200.

The different advantageous embodiments recognize and take into account a number of different considerations. For example, the different advantageous embodiments recognize and take into account that the designs of batteries may be complex. For example, with rectangular battery cells, rods or other structural components are used to form the battery.

In other words, the rods are placed around the battery cells. The rods are then secured to each other or to other components to form the battery. The assembly of battery cells with the rods is placed into a housing to form the battery.

The different advantageous embodiments recognize that during testing, reworking of a battery may be needed. For example, one or two battery cells may not perform within desired limits. As a result, the battery may be reworked by replacing those battery cells.

Currently, replacing battery cells may require disassembly of the entire battery. The different rods may be disassembled, the battery cells replaced, and the rods reassembled. The rods used to bind the battery cells together are large in number and require time to secure to each other to secure the battery cells. This type of design for the battery increases the amount of time needed to rework a battery. These rods may lose pre-load used to hold the battery cells together. This loss may occur from thermal cycling, creep, and/or vibration. As a result, the battery cells may be not held together as tightly as desired.

The different advantageous embodiments also recognize and take into account that current battery designs may provide for heat flow from the battery cells through the housing to a cooling system. For example, heat sinks may be present within the housing to increase the transfer of heat from the batteries to the housing. Materials for the housing are selected as ones that have a rate of conductivity for heat that allows for a desired amount of heat to flow through the housing to a cooling system. Additionally, other materials or heat sinks may be attached to the exterior of the housing to increase the transfer of heat from the housing to a cooling system. These different types of systems increase the number of components, weight, and cost of a battery used in the spacecraft.

Thus, the different advantageous embodiments provide a method and apparatus for a battery system. In one advantageous embodiment, the battery system comprises a housing having a first side and a second side. The second side of the housing is configured to be connected to a cooling system. A plurality of channels extends from the first side to the second side of the housing. The plurality of channels has a first plurality of openings on the first side and a second plurality of openings on the second side. The plurality of channels is configured to receive a plurality of battery cells through the first plurality of openings. The plurality of battery cells is associated with the cooling system such that when the battery cells are placed in the plurality of channels and the second side is connected to the cooling system, heat passes directly from the plurality of battery cells to the cooling system.

Figure 3:
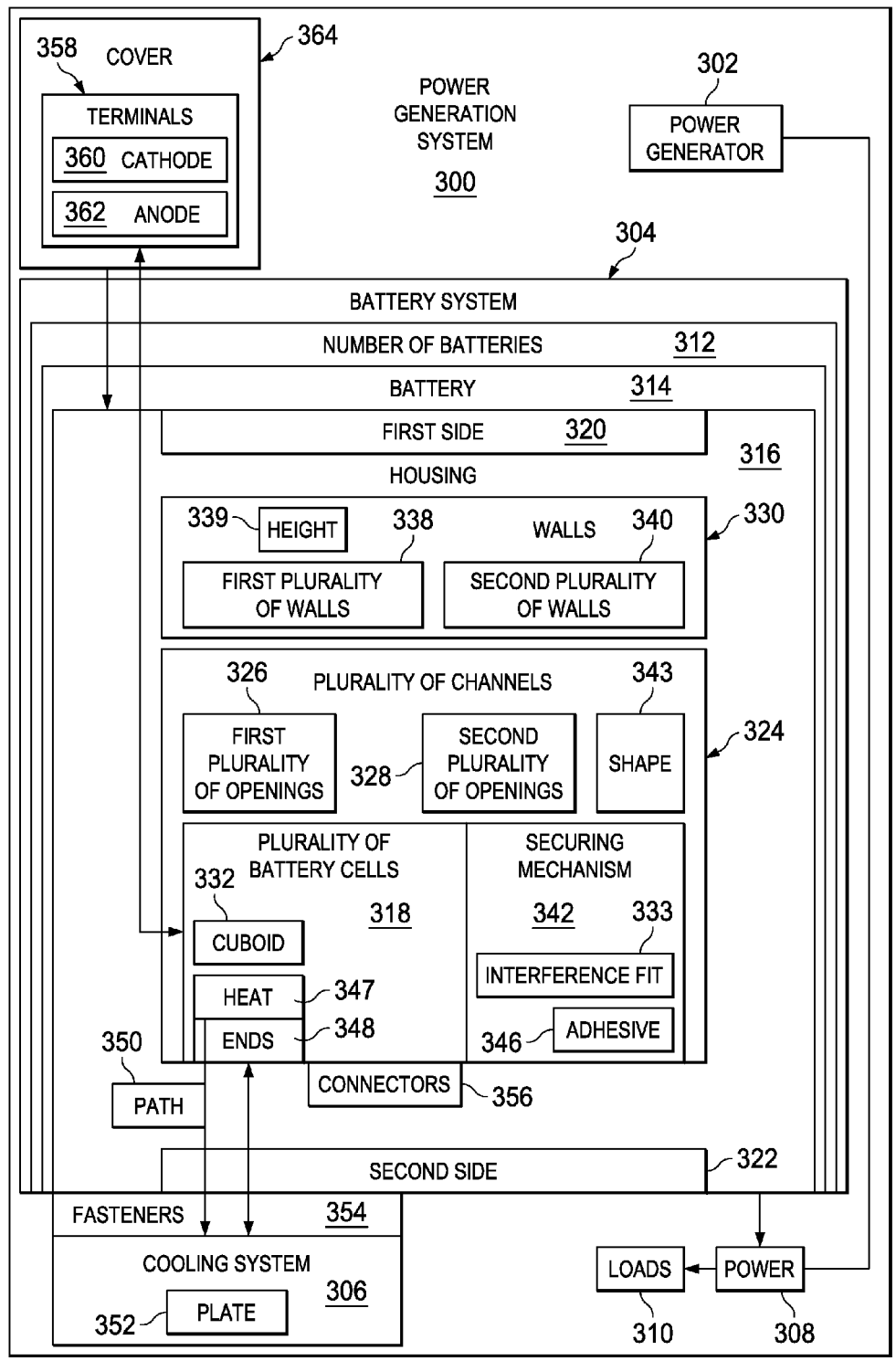
FIG. 3 is an illustration of a power generation system in accordance with an advantageous embodiment.

With reference now to FIG. 3, an illustration of a power generation system is depicted in accordance with an advantageous embodiment. Power generation system 300 is an example of one implementation for power generation system 216 in spacecraft 200 in FIG. 2.

As depicted, power generation system 300 includes power generator 302 and battery system 304. Power generator 302 and battery system 304 provide power 308 to loads 310. In these illustrative examples, power 308 takes the form of electrical power.

As depicted, power generator 302 may take a number of different forms. For example, without limitation, power generator 302 may include at least one of solar cells, a nuclear power unit, and other suitable types of power generation devices.

Battery system 304 comprises number of batteries 312. These batteries provide power 308 when power generator 302 is unable to provide power 308 or the amount of power 308 needed by loads 310. Loads 310 may comprise a number of different types of devices. For example, without limitation, loads 310 may include at least one of a computer, an inertial measurement unit, a sensor, an actuator system, a radiation measurement device, and/or some other suitable type of device that uses power 308.

In these illustrative examples, battery 314 within number of batteries 312 comprises housing 316 and plurality of battery cells 318. As depicted, housing 316 is formed as a single component. Housing 316 has first side 320 and second side 322.

Plurality of channels 324 extends through housing 316 between first side 320 and second side 322. In particular, plurality of channels 324 has first plurality of openings 326 on first side 320 and second plurality of openings 328 on second side 322. In other words, each of plurality of channels 324 has an opening on either side of housing 316. Plurality of channels 324 is configured to receive plurality of battery cells 318.

In these illustrative examples, plurality of channels 324 is formed by walls 330. In one illustrative example, walls 330 comprise first plurality of walls 338 and second plurality of walls 340. First plurality of walls 338 and second plurality of walls 340 are substantially orthogonal to each other in these illustrative examples. In other words, first plurality of walls 338 meets second plurality of walls 340 at substantially right angles.

In this illustrative example, plurality of battery cells 318 has a shape in the form of cuboid 332. Plurality of channels 324 has shape 343 that is configured to receive cuboid 332 of plurality of battery cells 318. Cuboid 332 has rectangular cross sections in these illustrative examples. Cuboid 332 also may be referred to as a right rectangular prism.

In these illustrative examples, walls 330 have height 339. Height 339 of walls 330 are such that at least a portion of plurality of battery cells 318 fit within plurality of channels 324. Height 339 may be such that part or all of each battery in plurality of battery cells 318 fits within plurality of channels 324.

Plurality of battery cells 318 is secured within plurality of channels 324 by securing mechanism 342. As depicted, securing mechanism 342 secures plurality of battery cells 318 to walls 330 for plurality of channels 324.

Securing mechanism 342 may take a number of different forms. For example, without limitation, securing mechanism 342 may be at least one of interference fit 333, adhesive 346, and any other suitable type of mechanism capable of securing plurality of battery cells 318 within plurality of channels 324.

In these illustrative examples, interference fit 333 secures plurality of battery cells 318 within plurality of channels 324 through friction with walls 330 forming plurality of channels 324. The friction may be caused by compression of plurality of battery cells 318 against walls 330.

When adhesive 346 is used, adhesive 346 attaches plurality of battery cells 318 to walls 330 within plurality of channels 324. Adhesive 346 may take a number of different forms. For example, without limitation, adhesive 346 may be a thermal plastic material, polyvinyl acetate, an epoxy material, polyurethane, a cyanoacrylate polymer, and other suitable types of adhesives.

In these illustrative examples, ends 348 of plurality of battery cells 318 are thermally connected to cooling system 306. In other words, ends 348 are connected to cooling system 306 in a manner that allows for heat 347 to flow from plurality of battery cells 318 to cooling system 306. For example, ends 348 are in contact with cooling system 306 such that heat 347 from plurality of battery cells 318 can travel to cooling system 306.

In these examples, heat 347 has path 350 that flows directly from plurality of battery cells 318 to cooling system 306. Ends 348 of plurality of battery cells 318 are in direct contact with cooling system 306. In these examples, direct contact means that no intermediate devices or components are present between ends 348 and cooling system 306.

In some illustrative examples, cooling system 306 may include a thermal gasket, a conductive lubricant, and/or some other thermal conductive material to provide an increased heat transfer between ends 348 and cooling system 306.

Cooling system 306 may take the form of plate 352. Battery 314 may sit on plate 352 such that ends 348 of plurality of battery cells 318 are in contact with plate 352.

In these illustrative examples, housing 316 may be secured to plate 352 with fasteners 354. Plate 352 may serve as a shelf or platform for battery 314, as well as other components within loads 310. Plate 352 may contain various cooling mechanisms. For example, plate 352 may act as a heat sink. Plate 352 may include, for example, without limitation, channels with cooling fluids, gasses, and other suitable types of mechanisms.

In these illustrative examples, walls 330 may be comprised of various types of materials. For example, without limitation, walls 330 may be comprised of a material selected from an electrically conductive material, an electrically insulating material, a heat conducting material, a heat insulating material, metal, ceramic, fiberglass, a composite material, aluminum, steel, and other suitable types of materials.

In these examples, housing 316 is a single-piece housing. The use of securing mechanism 342 within plurality of channels 324 reduces the number of components for battery 314 within number of batteries 312. With housing 316, reworking of battery 314 may be reduced in complexity when adhesive 346 is used.

Adhesive 346 may be removed from a channel within plurality of channels 324 to remove a battery cell from plurality of battery cells 318 for replacement. In this manner, disassembly of other components within battery 314 may be avoided.

Further, in these illustrative examples, walls 330 may be made as thin as needed to hold plurality of battery cells 318 in place. In other words, walls 330 do not need to have a thickness or strength to support plurality of battery cells 318. Walls 330 only need to have sufficient strength to hold plurality of battery cells 318.

Walls 330 may be supported by plurality of battery cells 318. This support may allow for a reduction in the thickness of walls 330. Further, with this type of architecture for housing 316, preloading or tension does not need to be placed upon various components, such as plurality of battery cells 318, to assemble battery 314. As a result, reducing the thickness of walls 330 may reduce the weight of battery 314.

Further, plurality of battery cells 318 is connected to each other in series and/or parallel. These connections may be made using connectors 356. Connectors 356 may be, for example, without limitation, wires, cables, and/or other suitable types of connectors that provide electrical connections. Plurality of battery cells 318 may also be connected to terminals 358. Terminals 358 may include cathode 360 and anode 362 in these examples. Terminals 358 may be associated with cover 364. Cover 364 may be secured to or attached to housing 316.

The illustration of power generation system 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, plurality of battery cells 318 may be cylindrical in shape. The cylindrical shape may be, for example, an elliptic cylinder, a circular cylinder, or some other type of cylindrical shape. Additionally, plurality of battery cells 318 may have the shape of a cone, a frustum, a pyramid, or some other suitable shape. As a result, plurality of channels 324 may be circular, rather than cuboid in form. Of course, other shapes may be used, depending on the particular implementation. Additionally, in some advantageous embodiments, different cells in plurality of battery cells 318 may have different shapes, rather than all cells having the same shape.

FIGS. 4-9 illustrate different portions of a battery in accordance with an advantageous embodiment. These figures illustrate one implementation for a battery, such as battery 314 in FIG. 3.

Figure 4:
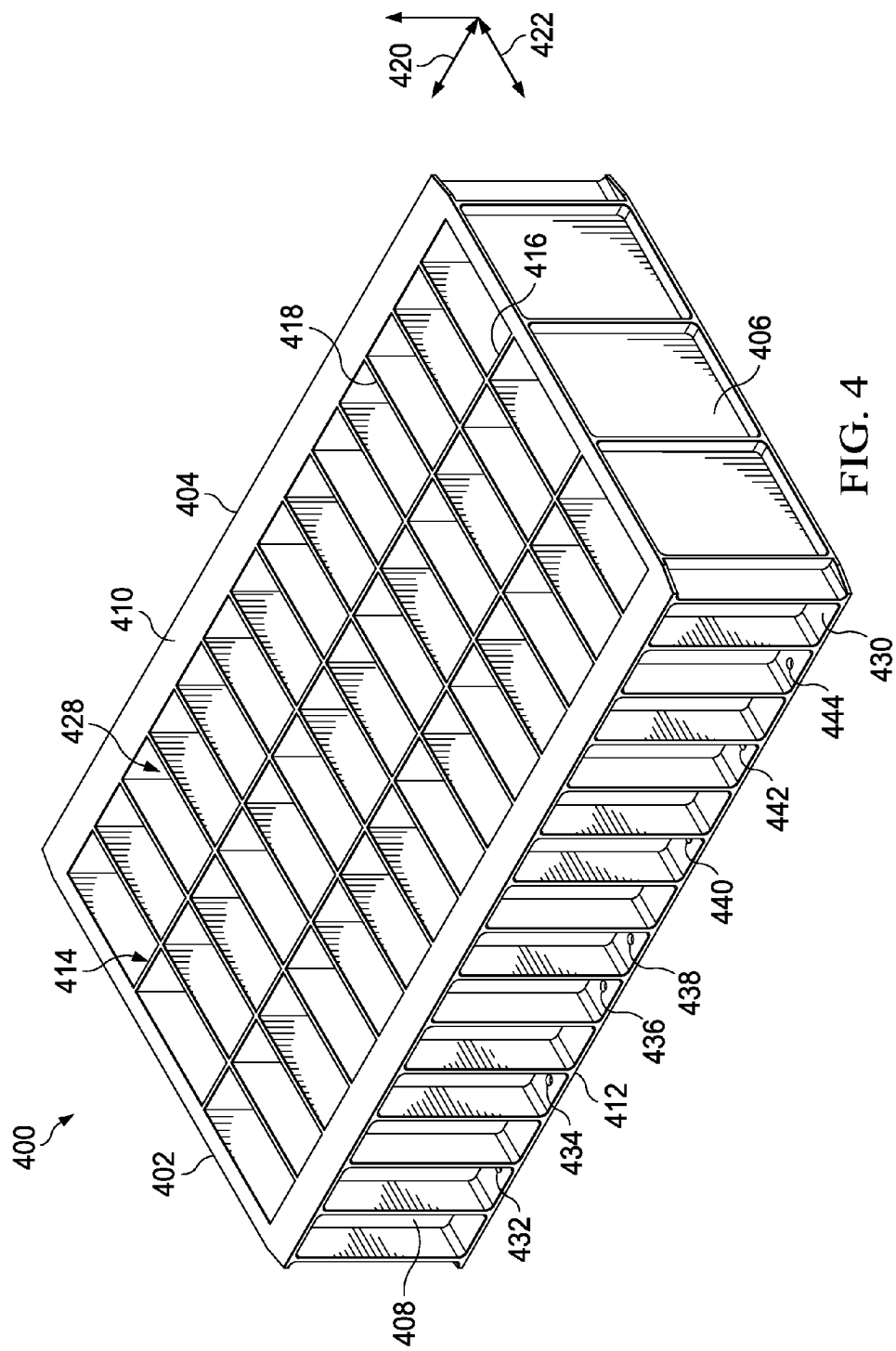
FIG. 4 is an illustration of a housing for a battery in accordance with an advantageous embodiment.

With reference now to FIG. 4, an illustration of a housing for a battery is depicted in accordance with an advantageous embodiment. In this example, housing 400 is an example of one implementation for housing 316 in FIG. 3. Housing 400 has sides 402, 404, 406, and 408. Additionally, housing 400 has first side 410 and second side 412.

Housing 400 comprises walls 414. Walls 414 include first plurality of walls 416 and second plurality of walls 418. First plurality of walls 416 extends along the direction of arrow 420. Second plurality of walls 418 extends in the direction of arrow 422.

In these illustrative examples, first plurality of walls 416 and second plurality of walls 418 are substantially orthogonal to each other. In other words, first plurality of walls 416 meets second plurality of walls 418 at substantially right angles.

In these examples, plurality of channels 428 is formed by first plurality of walls 416 and second plurality of walls 418.

As depicted, plurality of channels 428 extends from first side 410 to second side 412 of housing 400. Additionally, flanges, such as flange 430, are present on housing 400. Flange 430 is located on second side 412. Flange 430 has holes 432, 434, 436, 438, 440, 442, and 444. These holes may be used to connect housing 400 to a cooling system or other platform.

Figure 5:
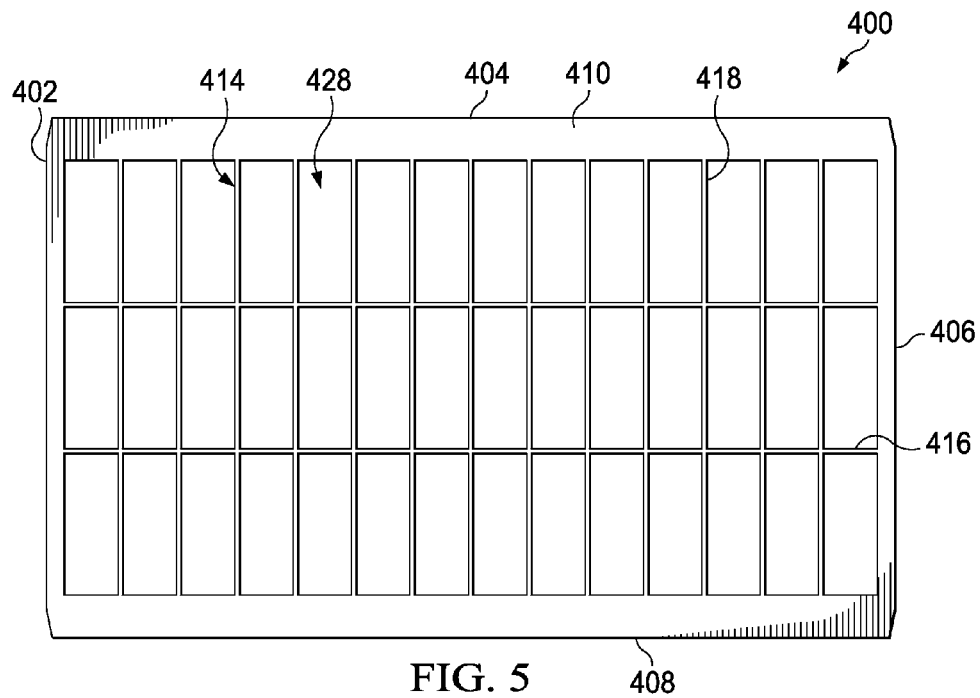
FIG. 5 is an illustration of a top view of a housing in accordance with an advantageous embodiment.

Turning to FIG. 5, an illustration of a top view of a housing is depicted in accordance with an advantageous embodiment. In this illustrative example, housing 400 is seen from a top view. As illustrated, first side 410 is visible, while second side 412 is hidden from view.

Figure 6:
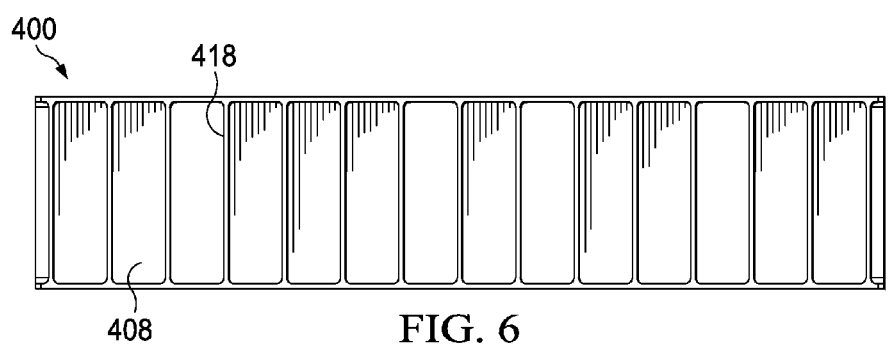
FIG. 6 is an illustration of a side view of a housing in accordance with an advantageous embodiment.
Figure 7:
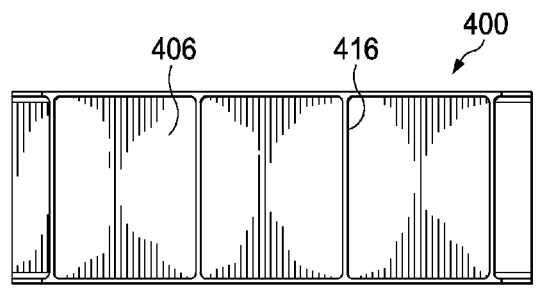
FIG. 7 is an illustration of another side view of a housing in accordance with an advantageous embodiment.

In FIG. 6, an illustration of a side view of a housing is depicted in accordance with an advantageous embodiment. In this illustrative example, side 408 of housing 400 is depicted. With reference now to FIG. 7, an illustration of another side view of a housing is depicted in accordance with an advantageous embodiment. In this example, side 406 of housing 400 is shown.

Figure 8:
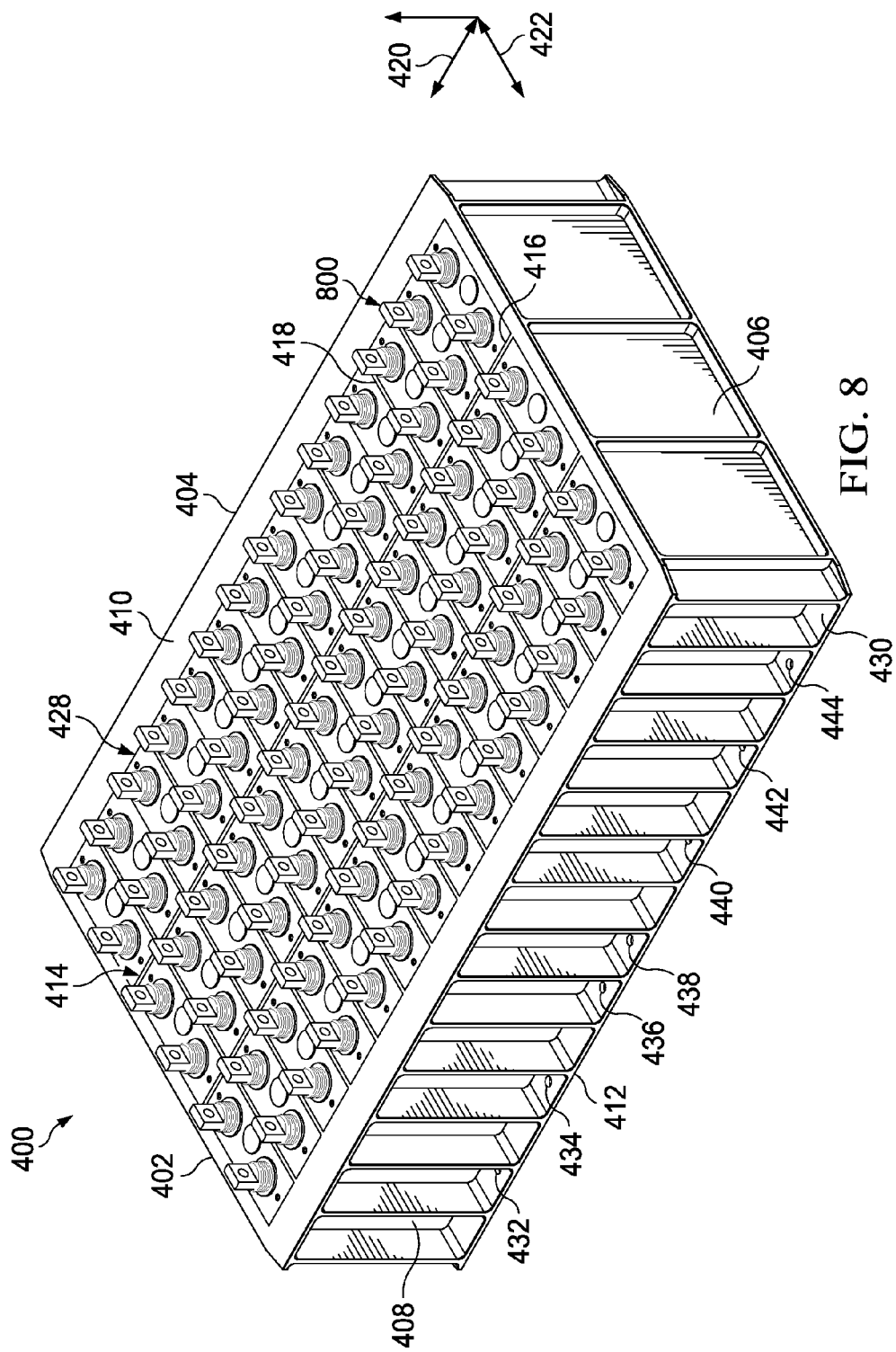
FIG. 8 is an illustration of a housing with battery cells in accordance with an advantageous embodiment.

With reference now to FIG. 8, an illustration of a housing with battery cells is depicted in accordance with an advantageous embodiment. In this view, housing 400 is shown in a perspective view with battery cells 800 in plurality of channels 428. In these examples, battery cells 800 are secured in plurality of channels 428. In particular, battery cells 800 are secured in plurality of channels 428 using a securing mechanism to secure battery cells 800 to walls 414.

Figure 9:
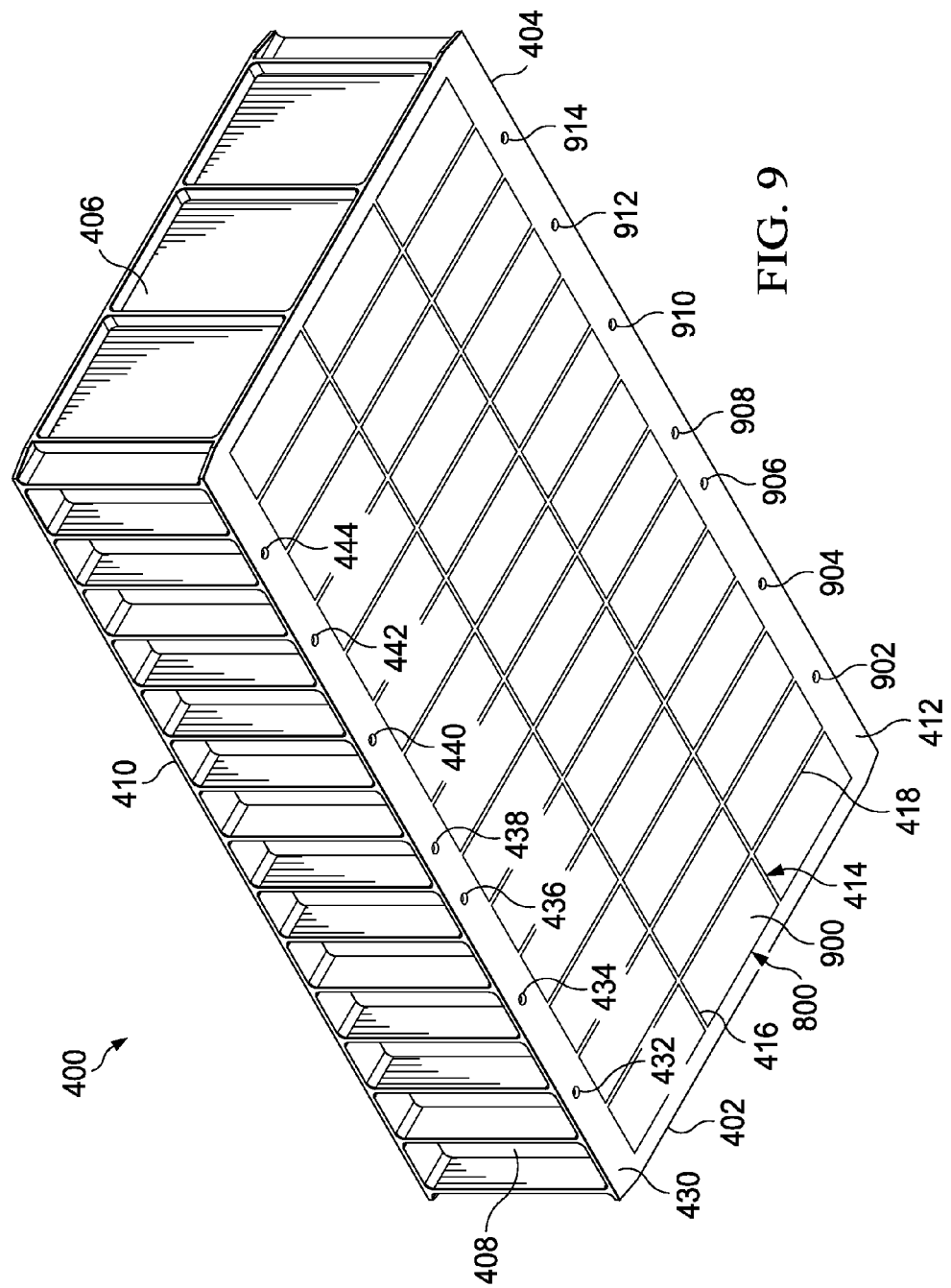
FIG. 9 is an illustration of a perspective view of a housing with batteries in accordance with an advantageous embodiment.

With reference now to FIG. 9, an illustration of a perspective view of a housing with batteries is depicted in accordance with an advantageous embodiment. In this example, a detailed view of second side 412 is illustrated. As can be seen in this view, ends 900 of battery cells 800 can be seen. Ends 900 are exposed on second side 412. In this manner, ends 900 of battery cells 800 may be connected to a cooling system. In particular, the connection may be a direct connection without needing any intervening components. Also, as illustrated, flange 430 includes holes 902, 904, 906, 908, 910, 912, and 914 in addition to holes 432, 434, 436, 438, 440, 442, and 444. These holes may be used to attach second side 412 to a cooling system.

FIGS. 10-13 illustrate different portions of a battery in accordance with an advantageous embodiment. These figures illustrate another implementation for battery 314 in FIG. 3.

Figure 10:
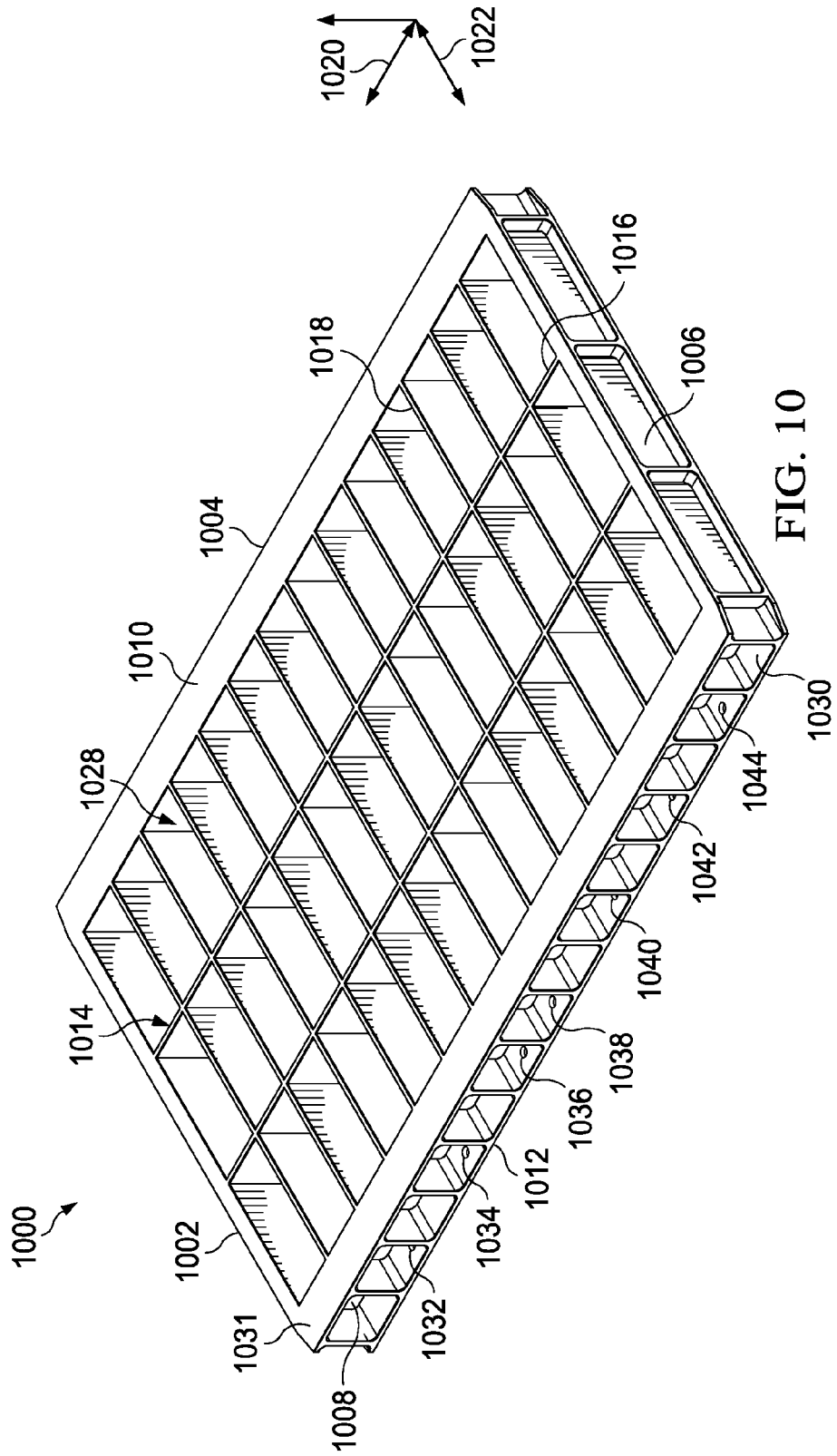
FIG. 10 is an illustration of a housing for a battery in accordance with an advantageous embodiment.

In FIG. 10, an illustration of a housing for a battery is depicted in accordance with an advantageous embodiment. In this example, housing 1000 is an example of another implementation for housing 316 in FIG. 3.

As depicted, housing 1000 has sides 1002, 1004, 1006, and 1008. Additionally, housing 1000 has sides 1010 and 1012.

As illustrated, housing 1000 comprises walls 1014. Walls 1014 include first plurality of walls 1016 and second plurality of walls 1018. First plurality of walls 1016 extends in the direction of arrow 1020, while second plurality of walls 1018 extends in the direction of arrow 1022. First plurality of walls 1016 and second plurality of walls 1018 meet at substantially right angles.

In these examples, walls 1014 form plurality of channels 1028. As can be seen, in these examples, plurality of channels 1028 has a cuboid shape. Plurality of channels 1028 extends from first side 1010 to second side 1012 of housing 1000. Additionally, flange 1030 and flange 1031 extend around sides 1012 and 1010, respectively. Flange 1030 has holes 1032, 1034, 1036, 1038, 1040, 1042, and 1044.

Figure 11:
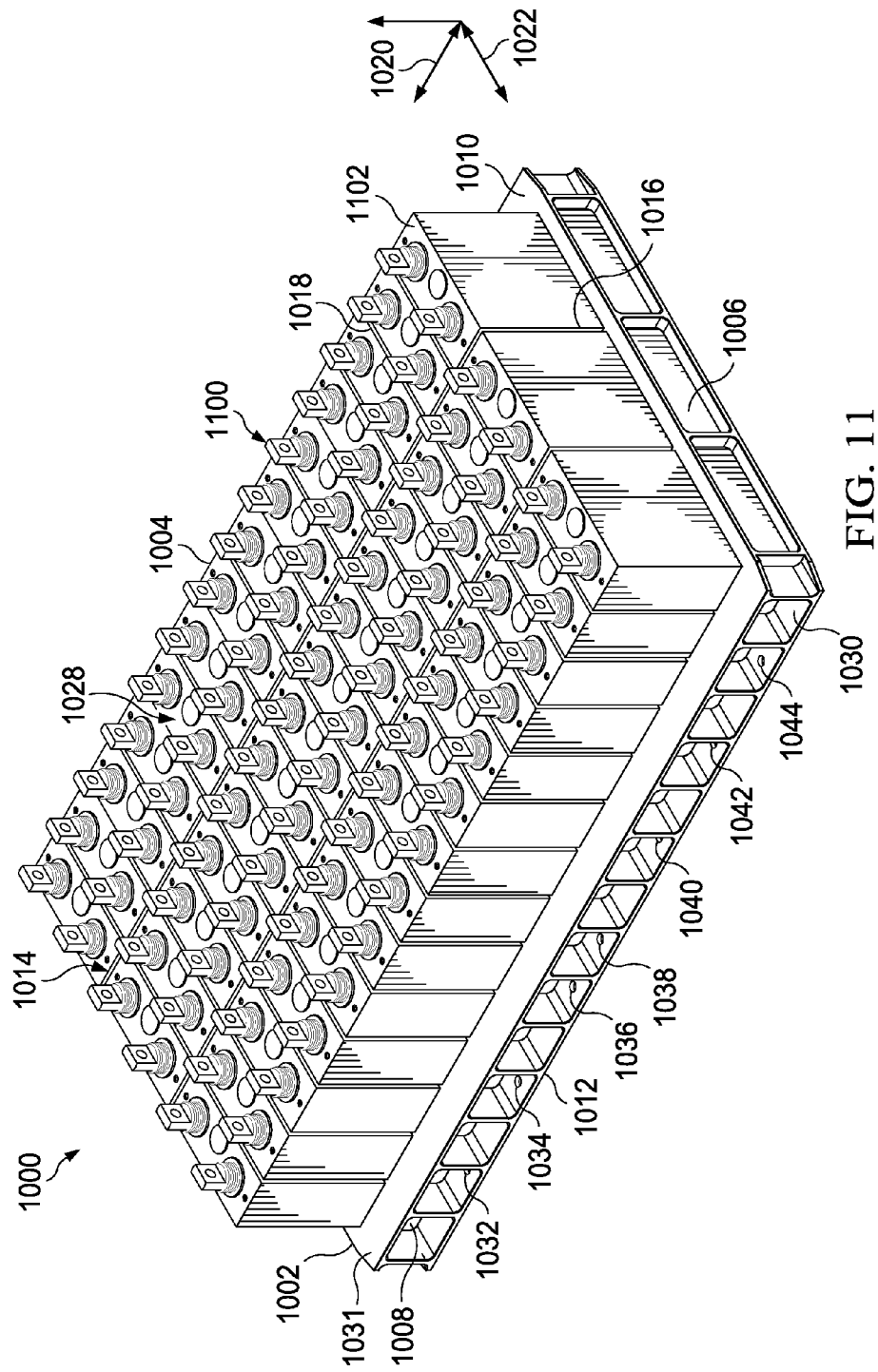
FIG. 11 is an illustration of a perspective view of a housing with batteries in accordance with an advantageous embodiment.

With reference now to FIG. 11, an illustration of a perspective view of a housing with batteries is depicted in accordance with an advantageous embodiment. In this example, battery cells 1100 have been placed into plurality of channels 1028. As can be seen in this illustrative example, walls 1014 do not extend all the way up to end 1102 for battery cells 1100.

In this example, only a portion of battery cells 1100 fit within plurality of channels 1028. In other words, each battery cell within battery cells 1100 does not fit all the way into a channel within plurality of channels 1028.

Figure 12:
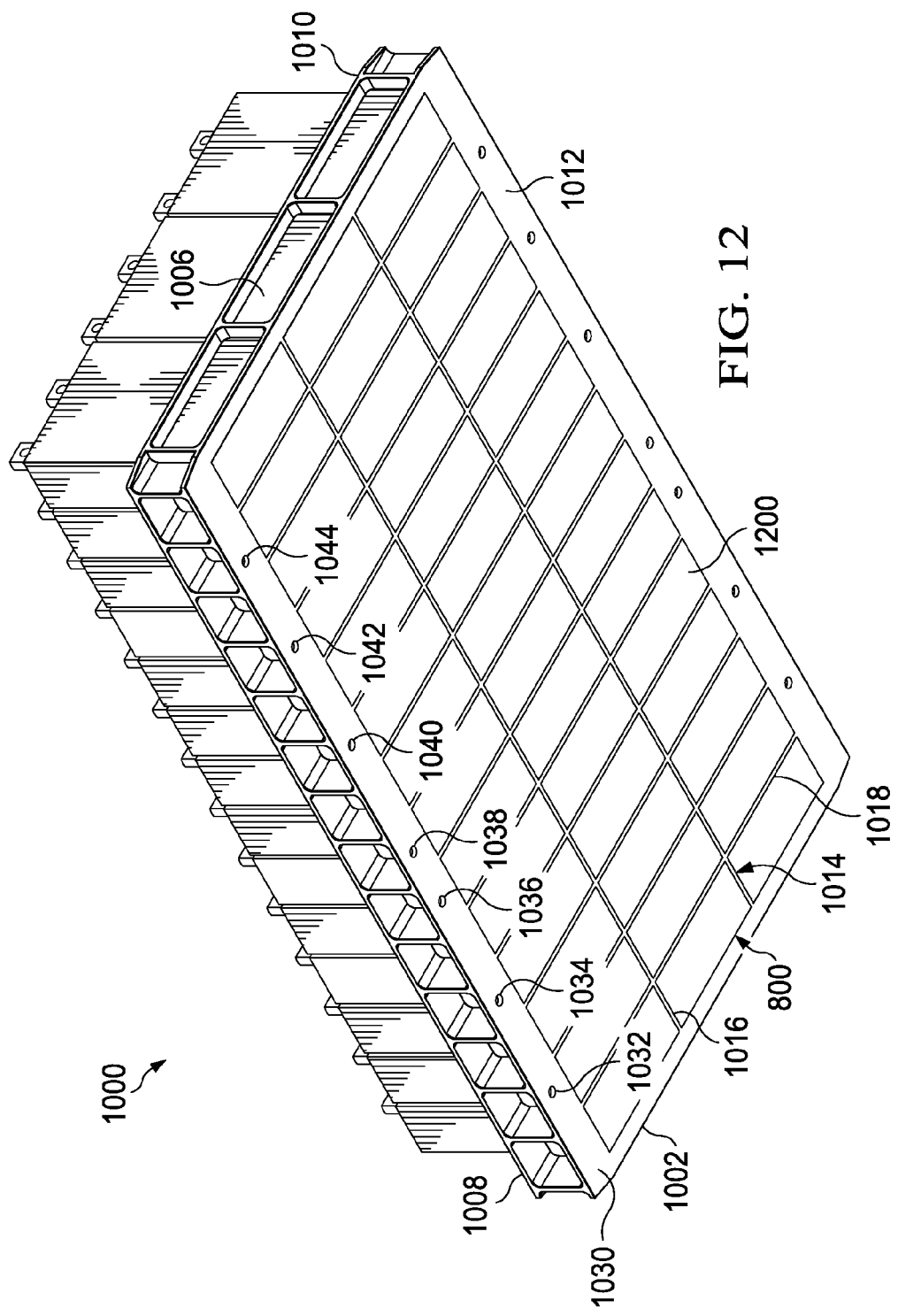
FIG. 12 is an illustration of a perspective view of a housing with battery cells in accordance with an advantageous embodiment.

With reference now to FIG. 12, an illustration of a perspective view of a housing with battery cells is depicted in accordance with an advantageous embodiment. In this example, a view of second side 1012 is illustrated. As can be seen in this view, ends 1200 of battery cells 1100 can be seen. Ends 1200 are exposed on second side 1012. In this manner, ends 1200 of battery cells 1100 may be connected to a cooling system.

Figure 13:
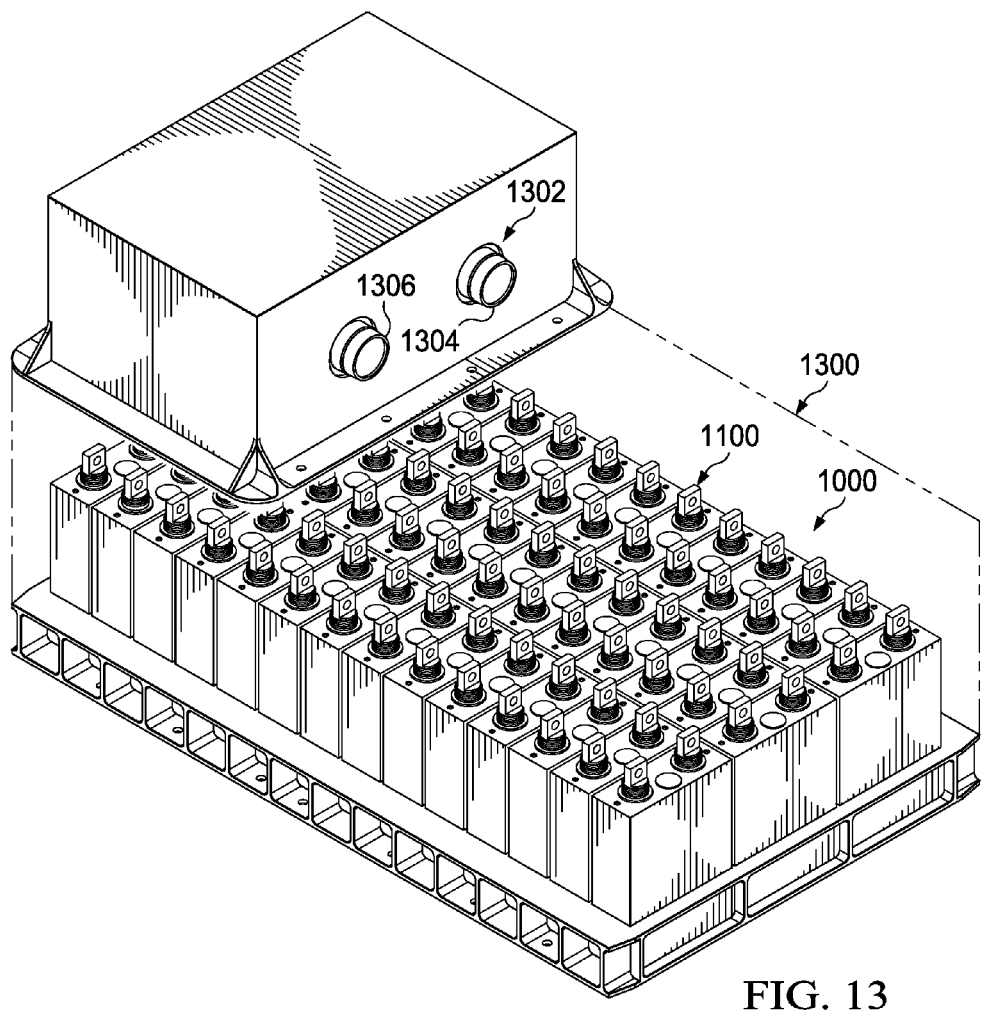
FIG. 13 is an illustration of a perspective view of a battery with a cover in accordance with an advantageous embodiment.

In FIG. 13, an illustration of a perspective view of a battery with a cover is depicted in accordance with an advantageous embodiment. In this illustrative example, cover 1300 is placed onto housing 1000. Cover 1300 is shown in a partially-exposed view, such that battery cells 1100 can be seen under cover 1300.

In these examples, cover 1300 includes terminals 1302. Terminals 1302 include cathode 1304 and anode 1306. Terminals 1302 may be connected to battery cells 1100. Battery cells 1100, in turn, may be connected to each other in series or parallel, depending on the amount of current or voltage desired. The connections are not shown in this example.

The illustrations of the different portions of batteries in FIGS. 4-13 have only been provided as illustrations of some implementations for battery 314 in FIG. 3. Other advantageous embodiments may be implemented with various changes. For example, the channels may be circular with the batteries being cylindrical shaped, rather than a cuboid.

Figure 14:
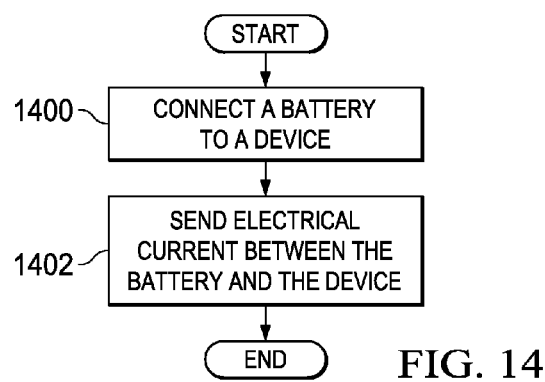
FIG. 14 is an illustration of a flowchart of a process for sending electrical current to a device in accordance with an advantageous embodiment.

Turning now to FIG. 14, an illustration of a flowchart of a process for sending electrical current to a device is depicted in accordance with an advantageous embodiment. The process illustrated in FIG. 14 may be implemented in power generation system 300 in FIG. 3. More specifically, this process may be implemented using battery 314 in battery system 304 in FIG. 3.

The process begins by connecting a battery to the device (operation 1400). The battery comprises a housing having a first side with a first plurality of openings and second side with a second plurality of openings. The second side is configured to be connected to a cooling system. The battery includes a plurality of battery cells located within a plurality of channels extending from the first side of the housing to the second side of the housing. The plurality of battery cells is located within the plurality of channels. The second side is connected to the cooling system. The plurality of battery cells is directly connected to the cooling system through the second plurality of openings in the second side such that heat passes directly from the plurality of battery cells to the cooling system.

In operation 1400, the battery may be connected to the device in a number of different ways. For example, the battery may be connected by directly connecting the device to the battery using a cable or wires. Additionally, a switch may be present to complete the connection between the battery and the device. The process then sends electrical current between the battery and the device (operation 1402), with the process terminating thereafter.

In operation 1402, the current may travel from the battery to the device if the battery is powering the device. For example, the device may be a computer, a sensor, or some other suitable type of load. In other advantageous embodiments, the device may be a power generation system, such as solar cells. In this example, the device may send power to the battery to recharge the battery.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for providing power. In one advantageous embodiment, an apparatus comprises a first plurality of walls that meet a second plurality of walls at substantially right angles to form a housing with a first side and a second side. A plurality of channels formed by the first plurality of walls and the second plurality of walls extends through the housing from the first side to the second side, in which the plurality of channels has a first plurality of openings on the first side and a second plurality of openings on the second side of the housing. The plurality of channels has substantially the same shape and is configured to receive a plurality of battery cells.

In other advantageous embodiments, a battery system comprises a housing having a first side and a second side, in which the second side is configured to be connected to a cooling system. The battery system also has a plurality of channels extending from the first side to the second side of the housing. The plurality of channels is configured to receive a plurality of battery cells. The plurality of battery cells is configured to be associated with the cooling system when the plurality of battery cells is placed into the plurality of channels and the second side is connected to the cooling system. In this manner, heat may pass directly from the plurality of battery cells to the cooling system.

With one or more of the advantageous embodiments, at least one complexity and cost may be reduced for a battery system. For example, housing 316 in FIG. 3 may be a single piece, rather than multiple pieces. This reduction in the number of parts reduces the complexity of assembling a battery. Also, the heat transfer may be increased with the battery in different advantageous embodiments.

The description of the different advantageous embodiments has been presented for purposes of illustration and description and is not intended to be exhaustive or limited to the embodiments in the form disclosed. Many modifications and variations will be apparent to those of ordinary skill in the art.

Although the different illustrative examples have been discussed with respect to spacecraft, battery system 304 with battery 314 in FIG. 3 may be used in other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, an aircraft, a submarine, a bus, a personnel carrier, a tank, a train, an automobile, a surface ship, a power plant, a dam, a manufacturing facility, a building, and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for sending an electrical current between a battery and a device, the method comprising:
    (a) forming a housing comprising three sets of opposing sides via:
        forming a grid comprising a plurality of channels extending from a first side of the grid to a second side of the grid, via arranging a first plurality of walls comprising an equal height orthogonally to a second plurality of walls comprising the equal height;
        forming a first flange over a first side of the grid, a perimeter of the first flange aligning flush with an end of each of the first plurality of walls and an end of each of second plurality of walls; and
        forming a second flange over a second side, opposite the first side of the grid, a perimeter of the second flange aligning flush with the end of each of the first plurality of walls and the end of each of second plurality of walls, thus forming a plurality of open chambers located along an exterior of the housing, each open chamber in the plurality of open chambers comprising a rectangular shape comprising the first flange, the second flange, and a set of parallel walls from at least one of: the first plurality of walls, and the second plurality of walls;
        forming a battery comprising the housing and a plurality of battery cells, via arranging the plurality of battery cells via locating each battery of the plurality of battery cells within each channel of the plurality of channels;
    (b) connecting the battery to the device.

2. The method of claim 1, further comprising the second flange comprising holes usable for connecting the housing to a cooling system.

3. The method of claim 1, wherein the plurality of channels comprises a right rectangular prism.

4. The method of claim 1, further comprising:
connecting the second side to a cooling system; and
passing heat directly from the plurality of battery cells to the cooling system when the plurality of battery cells is placed into the plurality of channels and the second side is connected to the cooling system.

5. The method of claim 4, wherein the cooling system comprises a plate with a cooling mechanism.

6. The method of claim 1, further comprising:
securing the plurality of battery cells within the plurality of channels using a securing mechanism.

7. The method of claim 6, wherein the securing mechanism comprises an adhesive configured to attach the plurality of battery cells to the first plurality of walls and the second plurality of walls.

8. The method of claim 7, wherein the adhesive is selected from the group consisting of: a thermal plastic material, polyvinyl acetate, an epoxy material, polyurethane, and a cyanoacrylate polymer.

9. The method of claim 1, wherein the device comprises a power generation system, and wherein the method further comprises:
recharging the plurality of battery cells using the device.

10. The method of claim 1, wherein the plurality of battery cells has a shape selected from one of a cuboid and a cylinder.

11. The method of claim 1, wherein the first plurality of walls and the second plurality of walls are composed of a material that is configured to conduct heat.

* * * * *